(12) United States Patent
Pieger et al.

(10) Patent No.: US 11,084,213 B2
(45) Date of Patent: Aug. 10, 2021

(54) POSITIONING OF A BUILDING PLATFORM IN A POWDER BED DEVICE FOR ADDITIVE MANUFACTURING

(71) Applicant: TRUMPF Laser- und Systemtechnik GmbH, Ditzingen (DE)

(72) Inventors: Markus Pieger, Stuttgart (DE); Damien Buchbinder, Berlin (DE); Frederik Schaal, Fellbach (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 272 days.

(21) Appl. No.: 16/406,622

(22) Filed: May 8, 2019

(65) Prior Publication Data

US 2019/0263062 A1    Aug. 29, 2019

Related U.S. Application Data

(63) Continuation of application No. PCT/EP2017/078138, filed on Nov. 3, 2017.

(30) Foreign Application Priority Data

Nov. 11, 2016  (DE) .......................... 102016121673.9

(51) Int. Cl.
*B29C 64/245* (2017.01)
*B29C 64/153* (2017.01)
(Continued)

(52) U.S. Cl.
CPC ............ *B29C 64/245* (2017.08); *B22F 10/20* (2021.01); *B29C 64/153* (2017.08);
(Continued)

(58) Field of Classification Search
CPC ... B29C 64/153; B29C 64/245; B29C 64/393; B33Y 10/00; B33Y 30/00; B33Y 40/00;
(Continued)

(56) References Cited

U.S. PATENT DOCUMENTS

2016/0175935 A1    6/2016  Ladewig et al.

FOREIGN PATENT DOCUMENTS

DE    102014213888    1/2016
DE    102014014888    4/2016
(Continued)

OTHER PUBLICATIONS

DE102014014888A1-MT (Year: 2016).*
(Continued)

*Primary Examiner* — Matthew J Daniels
*Assistant Examiner* — Yunju Kim
(74) *Attorney, Agent, or Firm* — Fish & Richardson P.C.

(57) ABSTRACT

A method for producing a control signal for positioning a holder of a solid freeform fabrication device that is height-adjustable relative to a working surface, comprising arranging a structural platform on the holder; capturing a plurality of images of the working surface in the region of the holder, an image-specific height of the holder being adjusted before the detection of one of the plurality of images, and depending on the change of direction in the height, a powder layer is applied or removed; determining a powder boundary line between a powder-free region and a powder-covered region of the structural platform for at least two of the plurality of images, captured for differently adjusted image-specific heights of the holder, and producing a control signal for positioning the holder on the basis of the at least two powder boundary lines. The holder can be aligned according to the control signal.

19 Claims, 6 Drawing Sheets

(51) Int. Cl.
  *B29C 64/393* (2017.01)
  *B22F 10/20* (2021.01)
  *B22F 10/30* (2021.01)
  *B22F 10/10* (2021.01)
  *B22F 10/00* (2021.01)
  *G06T 17/00* (2006.01)
  *G06T 1/00* (2006.01)
  *B33Y 30/00* (2015.01)
  *B33Y 50/02* (2015.01)
  *B33Y 10/00* (2015.01)
  *B33Y 40/00* (2020.01)

(52) U.S. Cl.
  CPC ............ *B29C 64/393* (2017.08); *B33Y 30/00* (2014.12); *B33Y 50/02* (2014.12); *G06T 1/0014* (2013.01); *G06T 17/00* (2013.01); *B22F 10/30* (2021.01); *B33Y 10/00* (2014.12); *B33Y 40/00* (2014.12)

(58) Field of Classification Search
  CPC ....... B33Y 50/02; G06T 17/00; G06T 1/0014; B22F 10/00; B22F 10/10; Y02P 10/25
  USPC ....................................................... 264/40.1
  See application file for complete search history.

(56) References Cited

FOREIGN PATENT DOCUMENTS

DE  102015211538  12/2016
EP  2732890  8/2017

OTHER PUBLICATIONS

DE Office Action in German Appln. No. 102016121673.9, dated Aug. 17, 2017, 15 pages (with English translation).
PCT International Search Report and Written Opinion in International Appln. No. PCT/EP2017/078138, dated Mar. 19, 2018, 14 pages (with English translation).

\* cited by examiner

POSITIONING OF A BUILDING PLATFORM IN A POWDER BED DEVICE FOR ADDITIVE MANUFACTURING

CROSS REFERENCE TO RELATED APPLICATIONS

This application is a continuation of and claims priority under 35 U.S.C. § 120 from PCT Application No. PCT/EP2017/078138 filed on Nov. 3, 2017, which claims priority from German Application No. 10 2016 121 673.9, filed on Nov. 11, 2016. The entire contents of each of these priority applications are incorporated herein by reference.

TECHNICAL FIELD

The present disclosure relates to devices and methods for laser-based additive manufacturing and the levelling of a building platform for the provision of a suitably levelled powder surface for a subsequent manufacturing process.

BACKGROUND

Laser-based additive manufacturing of metallic or ceramic workpieces is based on a solidification of a starting material present on a building platform, e.g. in powder form by irradiation with laser light. This concept—also known as selective laser melting (SLM) or as powder bed fusion—is used in machines for (metal) 3D printing. An exemplary machine for the additive manufacturing of three-dimensional products by SLM is disclosed in the European patent application EP 2 732 890 A2. The advantages of additive manufacturing are generally a simple manufacture of complex and individually creatable parts. Thereby defined structures in the interior and/or force flow-optimized structures can be realized.

In laser-based additive manufacturing the building platform (also referred to as substrate plate) is usually aligned parallel to the working surface, substantially horizontally. The alignment and zero position can be determined manually, e.g., by placing a ruler/knife-edge square thereon in the cold state and adjusting accordingly. When the building platform is heated, this procedure is in conflict with aspects of working safety.

Described in DE 10 2014 014888 A1 is a method for detecting a misalignment of a plate on a height-adjustable substrate. The method is based on an optical structural pattern that is on the plate. The pattern is captured using a camera device during a repeated removal of powder layers and compared with reference patterns to obtain information for the readjustment of the alignment of the height-adjustable substrate.

SUMMARY

One aspect of this disclosure is based on providing a detection of tilting and/or a zero position of a building platform of an SLM machine.

In one aspect, a method for generating a control signal for positioning a substrate of a manufacturing device, which can be height-adjusted in relation to a working surface, for the additive manufacturing of a three-dimensional component from powder includes the following steps: arranging the building platform on the substrate, capturing a plurality of images of the working surface in the region of the substrate, wherein an image-specific height of the substrate is adjusted before capturing one of the plurality of images and depending on the change of direction in the height, a powder layer is applied or removed, determining a powder boundary line between a powder-free region and a powder-covered region of the building platform for at least two of the plurality of images, which have been captured for differently adjusted image-specific heights of the substrate, and producing a control signal for positioning the substrate based on the at least two powder boundary lines.

In a further aspect, a manufacturing device for the additive manufacturing of a three-dimensional component from a powder includes a manufacturing chamber with a working surface that includes a platform region, a building cylinder that includes a height-adjustable substrate on which the three-dimensional component is to be manufactured in layers on a surface of a building platform, an alignment device for positioning the substrate relative to the working surface, a sliding device for applying and/or removing a layer of powder in the platform region, an image generating device for obtaining image data of the platform region, and a control unit that is connected with the image generating device for receiving the image data and with the alignment device for adjusting the height and the alignment of the substrate, wherein the control unit is further configured for evaluating the image data according to the above summarized method and for generating and outputting a control signal for positioning the substrate based on the at least two powder boundary lines.

In a further aspect, a method for aligning a surface of a building platform, the building platform being arranged on a movable substrate of a manufacturing device for additive manufacturing of a three-dimensional component from powder includes the following steps: receiving a control signal generated according to the above summarized method for positioning the substrate, and aligning the substrate according to the control signal.

The concepts disclosed herein are generally based on iterative steps of applying and/or removing a layer of powder on/from the building platform about a predicted zero position (in the Z direction) and recording of images of the powder layer with a camera. To determine the tilt and the zero position (offset) of the building platform, the images are evaluated by image processing in which, for example, a powder tear-off line is determined (calculated) from the captured images.

The concepts disclosed herein are independent of structural patterns, because only the application and/or removal behavior of the powder with a coater is evaluated. Powder can be removed or applied until a portion of the building platform is completely free from powder. For example, a linear transition zone is formed between a powder-covered building platform and a powder-free building platform that allows the direction of a tilt of the substrate plate to be determined. Depending on the angle at which the building platform slopes, a newly produced linear transition zone moves more or less far within the plane of the building platform when changing a height of the building platform. With repeated changes in height and the applying or removing a layer processes (application and/or removal processes of powder in which respectively one new powder layer is applied or an upper powder layer is removed), the transition line moves between "powder-covered" and "powder-free" over the platform. Accordingly, in addition to the tilt direction of the platform, a tilt angle of the platform can also be determined from the change in height and the distance moved. The parameters tilt direction and tilt angle allow automated control of an alignment device carrying the substrate/the building platform so that the building platform can be adjusted parallel to the working surface.

To carry out the concepts disclosed herein, coaters that influence the formation of the linear transition zone as little as possible are suitable. These are, for example, brush coaters or coaters having soft coater lips.

Advantages of the concepts disclosed herein include an independence of special patterns (calibrated to a sensor system) on substrate plates. Linear transition zones can usually be determined considerably more easily than a pattern partially covered by a powder layer. Furthermore, an identification and a differentiation between a powder surface or a blank (powder-free) building platform is relatively independent of optical conditions such as any illumination given.

In general, the concepts disclosed herein can be implemented with a cost-effective and space-saving design of a sensor system and can also be used at high building platform temperatures. Thus, the concepts disclosed herein do not require any additional conventional distance sensors, thus avoiding costs and do not unnecessarily restrict the installation space.

Furthermore, the concepts disclosed herein can easily be retrofitted in SLM machines with camera-based powder bed monitoring since apart from an adapted control unit with suitably supplemented image processing software. No additional components are required.

DETAILED DESCRIPTION

Aspects described herein are partially based on the realization that a detection of the zero position and the alignment of a building platform can be needed for further automation of SLM systems, for example, to initiate an automatic start of an additive manufacturing (building job start). The alignment of a building platform (in particular its tilting with respect to the horizontal) is reflected in the appearance of a partially powder-covered building platform and results in a defined and building platform-dependent (e.g., linear for planar building platform surfaces) transition zone between powder-covered and powder-free regions.

Figure 1:
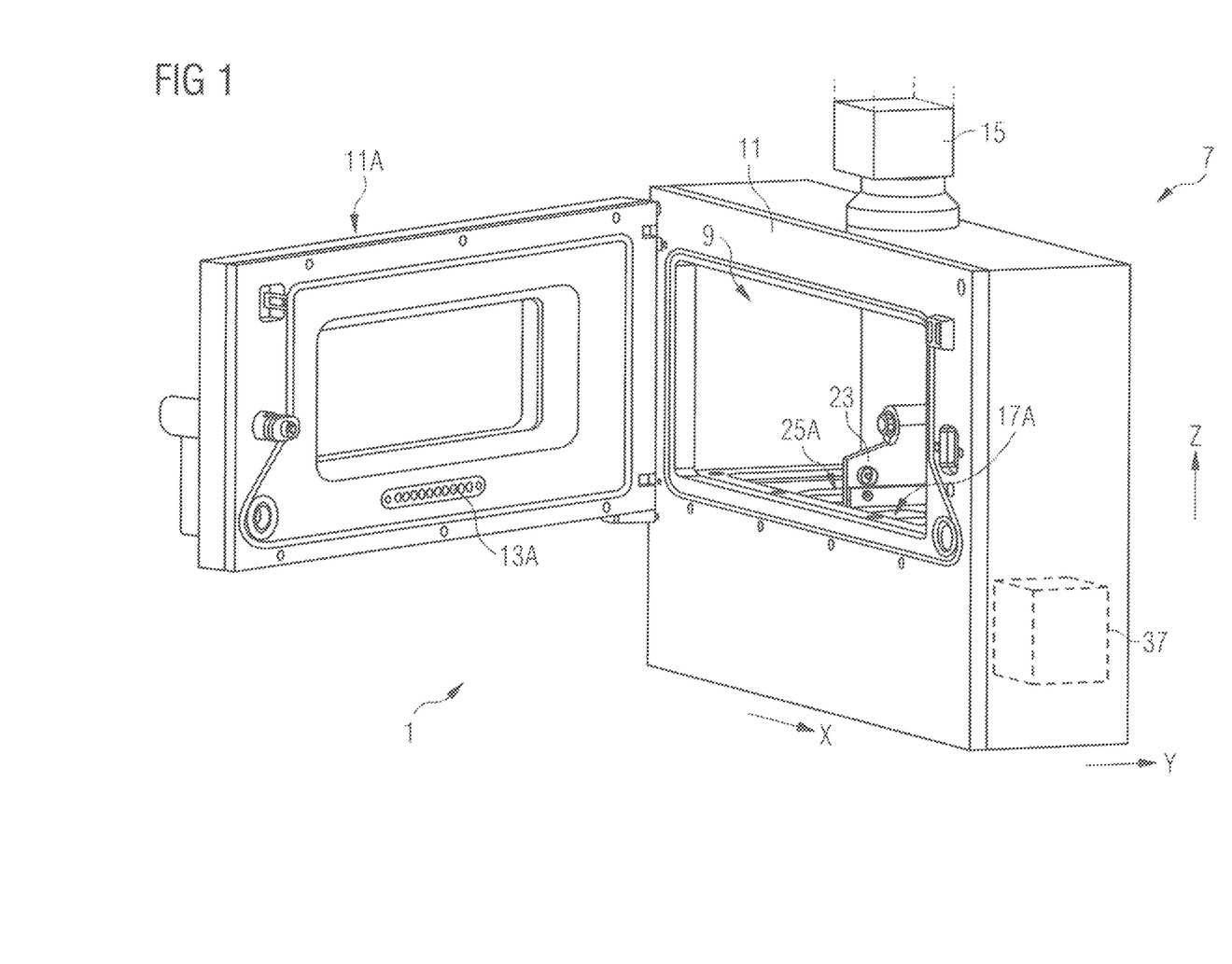
FIG. 1 shows a schematic spatial view of an exemplary additive manufacturing device.
Figure 2:
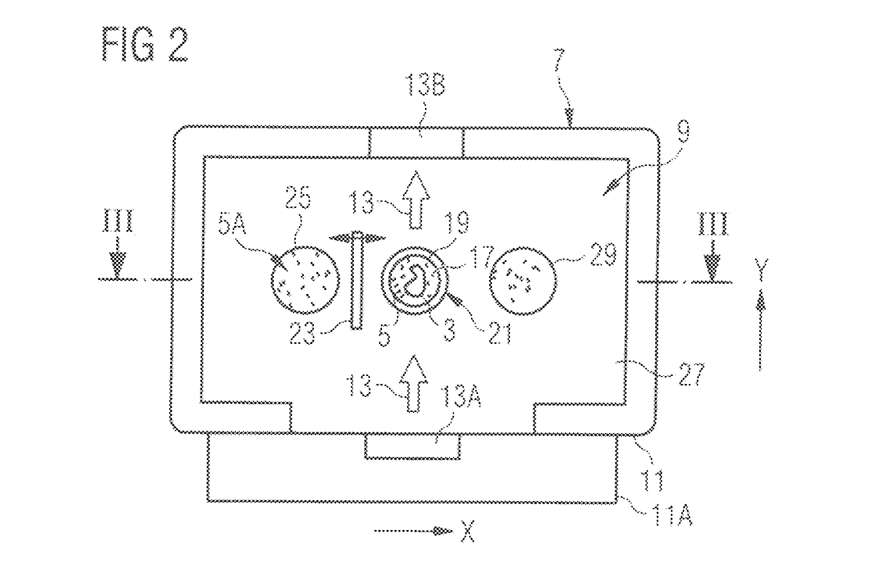
FIG. 2 shows a schematic sectional view of the additive manufacturing device of FIG. 1 parallel to the XY plane through the manufacturing chamber.
Figure 3:
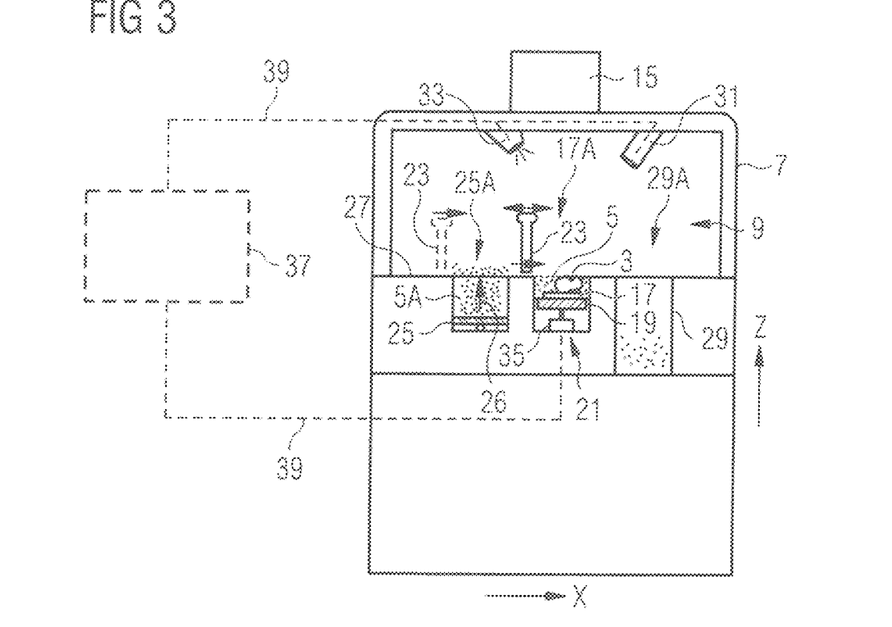
FIG. 3 shows a schematic sectional view of the additive manufacturing device of FIG. 1 parallel to the XZ plane through the manufacturing chamber, as indicated in FIG. 2.

FIGS. 1 to 3 show an exemplary additive manufacturing device 1 for the additive generation of a three-dimensional component 3 from a powder material (generally powder 5) in a perspective view and in schematic sectional views from and or from the front. For the manufacturing process reference is made to EP 2 732 890 A2, the contents of which are incorporated herein by reference.

The manufacturing device 1 includes a housing 7 with a manufacturing chamber 9. Access to the manufacturing chamber 9 is via a door 11A in a front wall 11. The housing 7 further includes a protective gas extraction system with outlet openings 13A, for flooding the manufacturing chamber 9 with inert gas, and extraction openings 13B. Flow behavior is indicated by arrows 13. An irradiation system 15 attached, for example, above the housing, is configured to produce laser light, which melts the powder 5 to form material layers of a 3D component 3.

The manufacturing process takes place on a working surface 27, which forms the bottom of the manufacturing chamber 9 and has a platform region 17A, a supply region 25A, and a powder collecting region 29A. The manufacturing process takes place on a building platform 17 arranged in the platform region 17A, e.g., centrally in front of the door 11A. The building platform 17 lies on a substrate 19, which can be adjusted in height (in FIG. 3 in the ±Z direction) in a building cylinder 21. The supply region 25A is used to provide fresh powder 5A that is transferred into the building platform region 23A with a coater 23 for layer-wise manufacturing of the 3D component 3.

On the building platform 17, a powder bed, filled, for example, with metal or ceramic powder, is prepared for irradiation with laser light from above. As shown in FIGS. 1 to 3, the coater 23 (often also called slider or wiper) is used to distribute the powder 5 in the X direction during the manufacturing process. During the layer applying process, a lower region of the coater 23 sweeps over the working surface 27, picks up powder, and thereby fills regions that are lower with respect to the working surface 27. In these regions, the lower portion of the coater 23 defines the level of the powder surface. Fresh powder 5, pushed upward in direction 26 in a supply cylinder 25 in the supply region 25A, is displaced with the coater 23 over the working surface 27 into the platform region 17A, where it accumulates in the region of the lowered building platform 17. The region is accordingly coated. Powder not required is brought into a collecting cylinder 29 in the powder collecting region 29A. During layer removing, the coater 23 can remove a layer of powder from the previously raised building platform by sweeping over it.

As shown as an example in the figures, the supply region 25A, the platform region 17A, and the powder collecting region 29A are arranged next to one another offset in the X direction and the coater 23 is moveable in the X direction.

The manufacturing process includes a repeated lowering of the building platform 17 in the building cylinder 21, a build-up of a fresh powder layer on the building platform 17, and a melting of the powder layer in the region in which the 3D component 3 is to be produced. FIG. 3 shows the partially finished 3D component 3 embedded in non-molten powder 5.

The manufacturing device 1 includes a camera 31 that is directed onto the platform region 17A and can provide image data of the surface of the powder bed (e.g., during completion of the laser processing). The manufacturing device 1 can include an illumination system 33 that provides a sufficient illumination of the platform region 17A for high-contrast images acquired by the camera 31.

An alignment of the building platform 17 is desired to provide a surface of the powder bed aligned with respect to the building platform (for example, a horizontal alignment of a planar building platform). However, at the beginning of the manufacturing process, a tilting of the building platform 17 can exist due to heating of the platform to high temperatures, to mechanical installation tolerances, or to wedge errors that occur when refurbishing the reusable building platforms. The position of the zero position is usually adapted for each building platform 17, because the thickness of the building platform 17 fluctuates, for example, due to mechanical tolerances and/or due to removal of material during the refurbishing of building platforms already discussed.

A tilting and/or a zero position incorrect positioning of the building platform 17 can result in a wedge error or a height offset error in the powder start layer. If such errors are substantially greater than a layer thickness of the SLM process (typically 20-50 µm), binding errors of the starting layer can occur. This can in turn result in detachment or deformation of the component with corresponding rejects due to unusable components, possible damage to the building platform 17, and/or damage to the entire building job.

Herein, a concept for detecting tilting of a building platform and its zero position is proposed that can be integrated in a sensor system or already existing camera systems, or can be built on its own. The sensor system in this case can be configured such that it further enables an adjustment process of the mechanical levelling of the building platform 17 and/or an approaching to the building platform-specific zero position. Accordingly, the manufacturing device 1 includes an alignment device 35 for positioning the substrate 19 in relation to the working surface 27. The alignment device 35 is configured to adjust a tilting of the substrate 19 relative to the working surface 27 and optionally for displacing the substrate 19 in its height relative to the working surface 27.

The sensor system includes the camera 31, the illumination device 33 (optionally), the alignment device 35, and a control unit 37. The control unit 37 can be part of the control system of the manufacturing device 1 or it can be provided as an independent unit specifically for a levelling and/or an adjustment of the height of the substrate for a specific building platform 17 supported thereon in relation to the working surface 27. In FIGS. 1 and 3, the control unit 37 is indicated schematically by dashed lines and is connected to the camera 31, the illumination device 33, and the alignment device 35 via dashed dotted data connections 39.

Figure 4A:
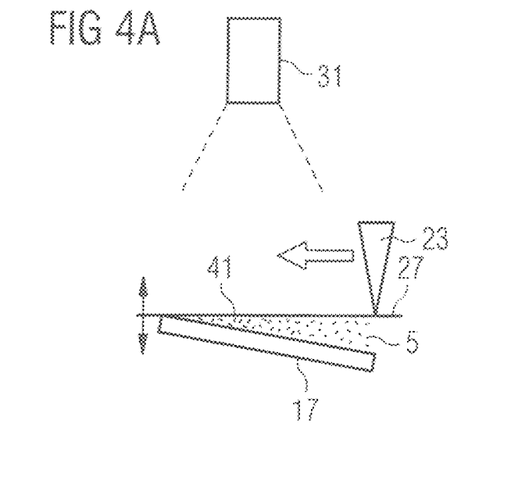
FIGS. 4A to 4C show a sequence of three height positions of a detection process.
Figure 4B:
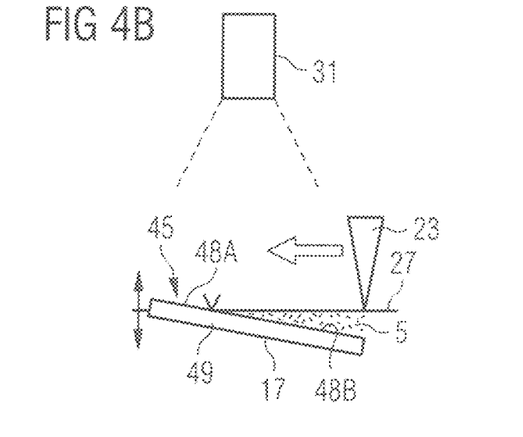
Figure 4C:
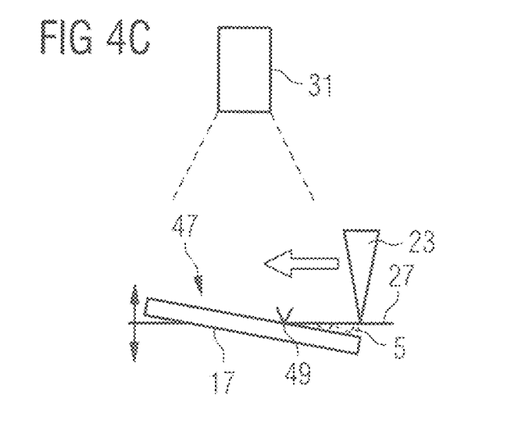

FIGS. 4A to 4C show schematically a measurement sequence that is based on a detection system including a system for optical imaging of the building platform 17 (e.g. camera 31 with objective) and optionally an illumination unit 33. In the course of the measurement sequence, the detection system records a stack of images of the building platform region 17A in an iterative detection process. In general, the measurement sequence includes several layer applying and/or layer removing processes of the building platform 17, where the building platform 17 becomes at least partially recognizable in the powder layer. The height of the building platform 17 is adjusted between individual layer applying and/or layer removing processes. An image processing of the image stack evaluates, as explained hereinafter, tilting and/or the zero position of the building platform 17.

FIGS. 4A to 4C show a tilted building platform 17 in three ascending height positions for three images of the stack of images. Before each image recording, powder 5 was distributed with the coater 23 over the platform region 17A so that the surfaces of the powder layers are configured substantially horizontally (assuming a corresponding horizontal alignment of the movement direction and the lower edge of the coater 23). However, a tilt effects the extent of the powder layer.

The sequence of the three height positions of FIGS. 4A to 4C is part of an embodiment of an iterative detection process based on an iterative layer removing from the building platform 17.

Figure 5A:
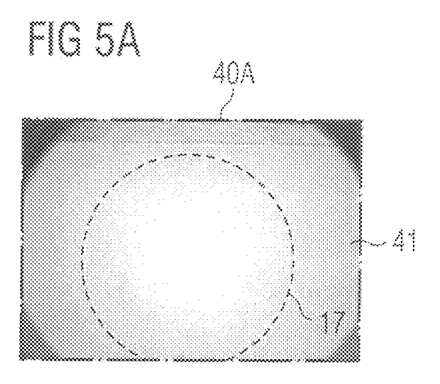
FIGS. 5A to 5F show images of the platform region 17A in six height positions.

FIG. 4A shows the building platform 17 in an initial height position in which the building platform 17 was lowered considerably lower than the estimated lower limit of the coater 23. If powder is now applied with the coater 23, a completely closed powder layer is obtained over the building platform 17 with a horizontal surface that is the upper side 41 of the powder bed in the region of the field of view of the camera. Several layers are applied to fill the entire volume above the building platform 17 with powder 5. If the powder layer does not extend completely over the building platform, the same should be lowered further and additionally coated. FIG. 5A shows a corresponding camera image of the powder bed. A substantially contour-free and uniform appearing upper side 41 of the powder bed is identified (without the building platform 17 shining through). The dark corners of the camera images 40A through 40F shown in FIGS. 5A to 5F are caused by vignette effects of the camera 31. The building platform 17 is indicated by a dashed circle in FIGS. 5A to 5F.

Figure 5B:
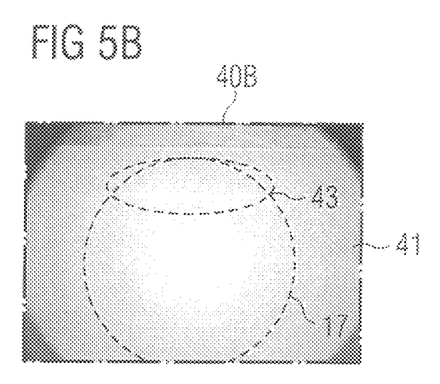

The building platform 17 is now raised with a step width of, for example, 50 µm and the corresponding powder layer thickness difference is removed by moving the coater 23. FIG. 5B shows a camera image of the powder bed in which first irregularities in the appearance of the upper side 41 of the powder bed can be identified in a region 43. However, the upper side 41 of the powder bed is still substantially uniform.

Figure 5C:
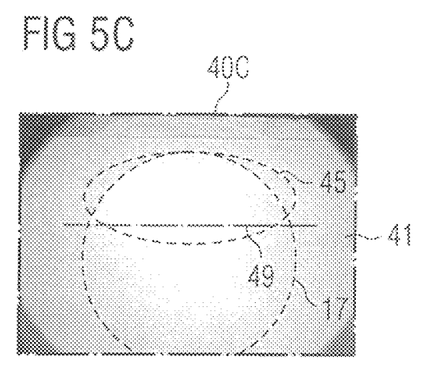

If the building platform is raised further the situation in FIG. 4B occurs in which a small portion 45 of the building platform 17 lies above the upper side 41 of the powder bed defined by the coater 23. The removing movement of the coater 23 thus exposes this small portion 45. FIG. 5C shows a camera image of the powder bed in which a surface region 45' corresponding to the small portion 45 is brighter than powder, because the building platform 17 reflects irradiated light more strongly than the powder. Thus, a greater irregularity in the appearance of the upper side 41 of the powder bed is identified.

Figure 5D:
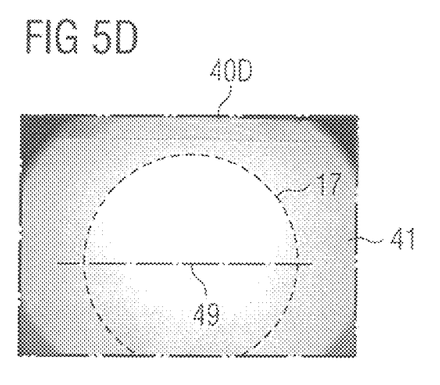
Figure 5E:
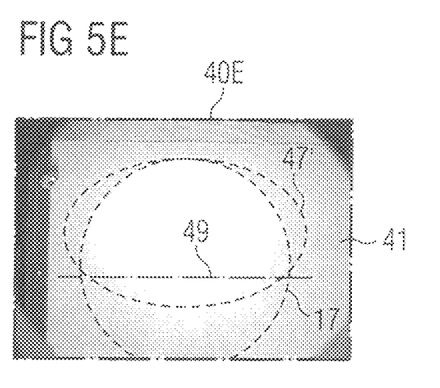
Figure 5F:
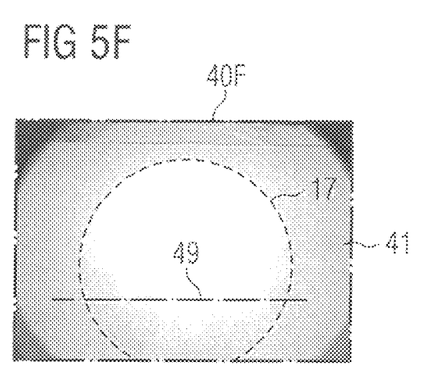

If the building platform 17 is raised further (see camera images 5D to 5F), the exposed region increases in size until the building platform 17 has been completely stripped.

In FIG. 4C a large portion 47 of the building platform 17 is exposed corresponding to the camera image of FIG. 5E with an enlarged surface region 47'. As will be explained subsequently, an image processing can determine the tilting on the exposed regions 48A and the powder-covered regions 48B (indicated schematically in FIG. 4B as well as in FIG. 6 described hereinafter).

In a further embodiment, an iterative detection process can be based on iterative layer applications. In this case, the building platform 17 is initially raised significantly higher than the estimated lower limit of the coater 23. If the building platform 17 is initially still partially or completely coated, it can be further raised, and any collision with the coater 23 eliminated to prevent further misalignments. The building platform 17 is then lowered with a step width of, for example, a few tens of µms, and powder is gradually applied by the coater 23. The building platform 17 is in this case initially coated in a small portion and then in increasingly larger portions. The development of the non-coated regions can also here be recorded and evaluated using corresponding camera images.

In both embodiments,—as an example of a powder boundary line in the case of a planar building plate—powder tear-off lines 49 are formed when partial regions of the building platform 17 are located at the height of the coater 23. The powder boundary tear-off lines 49 are indicated in FIGS. 4B and 4C with arrow tips and in FIGS. 5C to 5E with dashed dotted lines. The powder tear-off lines 49 can be obtained on the basis of the recorded image data. By automated evaluation (image processing) of the various powder tear-off lines 49 the direction and the gradient of the tilting of the building platform 17 can be detected. The strength of the gradient is obtained from the known displacement between two images. The zero position can be determined by a detection of a completely stripped building platform (e.g., after mechanical levelling) or by calculation of the center position from the gradient.

The iterative detection processes of the iterative layer application and the iterative layer removing steps can be applied to any tilt direction. They are independent of building platform tilt, whether in the, opposite to, or obliquely to the direction of movement (the layer applying/layer removing direction).

Figure 6:
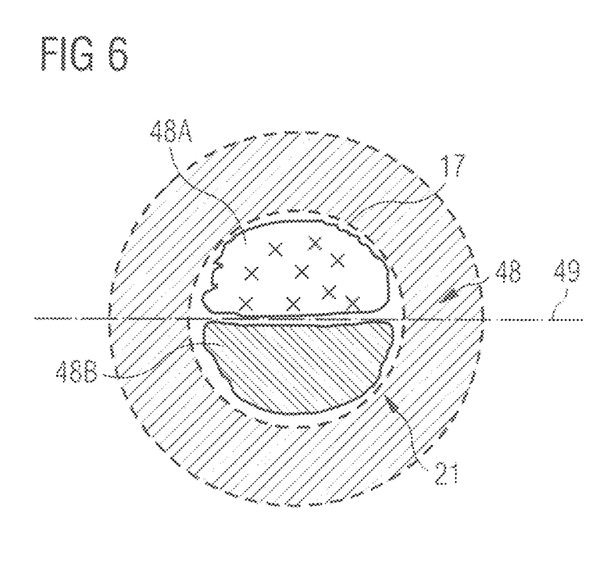
FIG. 6 shows a schematic subsequent drawing of the image of FIG. 5D.

FIG. 6 shows as an example in a sketch the information content of the image 40D of FIG. 5D. The outermost circular region is the field of view of the camera. Powder 5 can be identified in the outer recorded region and partially above the building cylinder 21. The building platform 17 is indicated by a dashed circle. In this exemplary embodiment, the diameter of the building platform 17 approximately corresponds to that of the building cylinder 21. The dashed circle thus forms the boundary of the building chamber 17/of the substrate 19 to the static working surface 27 (bottom of process chamber).

The level of the powder surface inside the building cylinder 21 corresponds to the surface of the powder bed during the manufacturing process and the last applied or removed layer during the image capture process disclosed herein. The level is defined by the lower boundary of the slider 23 and is usually substantially at the height of the working surface 27.

Similarly to the image 40D in FIG. 5D, a portion of the building platform 17 is raised above the thus-defined level or the working surface 27 as a result of a given tilt of the surface in relation to the working surface 27, whether this be by a tilting of the substrate 19, an oblique placement of the building platform 17 on the substrate 19, or an asymmetric form of the building platform 17.

In the course of the image capture process disclosed herein, as the substrate is displaced to the present height, a powder layer is applied if the height adjustment was based on a lowering of the substrate 19 or a powder layer is removed if the height adjustment was based on a raising of the substrate 19. In both cases, a powder-free region 48A and a powder-covered region 48B are formed on top of the building platform 17 between which a substantially linear powder boundary line 48 is obtained (as shown in FIG. 6). The powder boundary line 48 is a boundary line that moves depending on the angle of inclination of the substrate plate, between powder on the building platform 17 and the blank working surface 27. The powder boundary line 48 can be assigned a linear transition zone, being the powder tear-off line 49 (dashed dotted). The orientation of the powder boundary line 48, which is defined by the tilt axis, the distance between powder boundary lines with known height difference defines the tilt angle, and the course of the powder boundary line in relation to the center, can be used to derive the desired zero position.

On the basis of the information obtained (tilt angle, tilt axis, and/or zero position), the alignment device 35 of the substrate of the building platform can be controlled. The building platform is accordingly aligned in level via the alignment of the substrate.

Based on the evaluation of the powder boundary line 48, e.g., the assigned powder boundary lines 49, a deviation of the surface of the building platform from an ideal alignment/ideal plane can be determined. The identification of such freeform errors lying outside the tolerance range can allow mechanical processing errors of building platforms to be detected, thereby avoiding the beginning of the formation of a 3D component on an incorrect building platform.

In general, the powder bed monitoring camera and the illumination in the housing ceiling can be used for image capture.

In general, one aspect of the image processing is to detect a position and an orientation of the powder tear-off lines where artefacts such as a "fraying" of the tear-off line, which can be caused by varying brush lengths or spots on the substrate plate, and compensate for them.

Exemplary embodiments of the coater 23 include brush coaters such as a carbon fiber brush or coaters with soft coater lips. With such coaters, a resolution of the tilt detection of less than 20% of the building platform width can be achieved, whereby a height resolution of about 30 μm is accordingly possible. Thus, the resolution substantially depends on the "strip formation" during tearing of the powder film, which in turn depends partly on the condition of the coater 23, its lower edge determining the surface of the powder bed such as the condition of the brush hairs.

The concepts proposed herein can be used on different types and states of building platforms such as polished substrate plates, older/multiply used substrate plates, and substrate plates with structural markings or changes in shape caused by usage due to sheared-off components, for example.

Image processing can be adapted to the surface and the material of the building platform and to the powder material with regard to the contrast to be detected. The image processing can be adapted to light and dark field illumination.

Stroke step widths usually lie in the range of the height resolution and can be further adapted to the plate sizes used. Exemplary stroke step widths lie in the range of 10 μm to 100 μm, for example, 30 μm or 50 μm.

Figure 7:
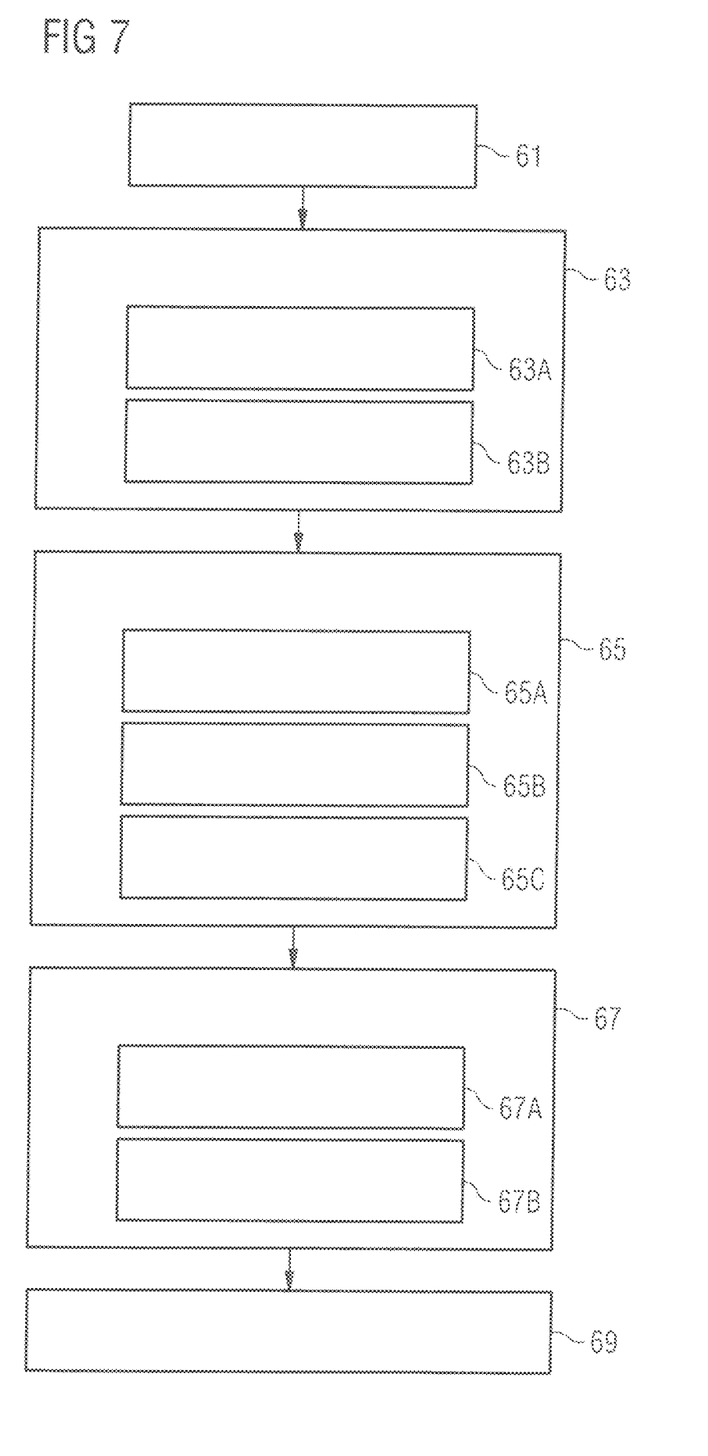
FIG. 7 shows a flow chart to illustrate the methods disclosed herein.

An example of a sequence of steps for the methods disclosed herein for producing a control signal for positioning a substrate of a manufacturing device, which can be height-adjusted in relation to a working surface, is summarized in FIG. 7.

In step 61, a building platform is arranged on the substrate. The positioning of the substrate should now be performed specifically for this arranged building platform. To this end, in step 63 a plurality of images of the working surface is captured in the region of the substrate, where before capturing one of the plurality of images in each case an image-specific height of the substrate is adjusted. Depending on the change in direction in the height, a powder layer is applied or removed. The resulting surface is captured with a camera. For at least two of the plurality of images in step 65, a powder boundary line that has formed between a powder-free region and a powder-covered region of the building platform, is determined, for example, by processing a difference image. The images are captured for differently adjusted image-specific heights of the substrate. A control signal for positioning the substrate is then produced based on the at least two powder boundary lines (step 67). The control signal thus produced is received by the control unit, which then aligns the substrate according to the control signal (step 69).

The powder boundary line can be determined by comparing the images among one another and/or by comparing at least one of the images with a reference image of a completely closed powder layer (step 63A). Optionally in step 63B, an image can be produced with a completely closed powder layer as a reference image.

In step 65A, a tilt angle is determined from the relative positions of at least two powder boundary lines. Thus a distance between two powder boundary lines in the plane of the working surface can be determined, and from this and from the respective change in height, the tilt angle can be calculated. A tilt axis direction in the working surface can be determined from at least one of the at least two determined powder boundary lines in step 65B. Additionally or alternatively, a zero position can be determined in step 65C from at least one of the at least two determined powder boundary lines where in the zero position the upper side of the building platform should lie in the plane of the working surface. The zero position can be determined from at least one image-specific height of the substrate in which the respective at least one powder boundary line runs close to the center over the building platform or in which—after alignment has taken place and repeated image capture of various heights—no more powder lies on the building platform.

As a control signal for positioning in step 67A a tilt angle control signal is output to an alignment unit of the substrate, which causes a tilting of the substrate by the specific tilt axis direction opposite to the calculated tilt angle. At step 67B a zero position adjustment signal can be output to the alignment unit of the substrate as control signal for positioning, which causes a displacement of the substrate into a height assigned to the zero position.

Alternatively, to generate the image data with a camera, the images to be evaluated can be obtained with a point/line sensor or scanner system. For example, the scanner of the working laser of the manufacturing device can be used as scanner system, wherein entire images are composed of subimages/points. The image can be generated by mechanical movement and combining the data of a point/line sensor or a camera, e.g., by moving the sensor system with the coater.

The concepts disclosed herein can further be extended to curved (e.g., concave or convex) surfaces, wherein the shape of the powder boundary line to be identified then extends nonlinearly. Such surface shapes can be present for a supplemental SLM build-up on an already partially pre-manufactured structure. Such deformations can occur during the reworking/revising of building platforms. During a tilting of such a surface shape, however, the powder boundary line similarly shifts over the building platform for different height positions.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, as limits of value ranges.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for generating a control signal for positioning a substrate of an additive manufacturing device that is height-adjustable in relation to a working surface and is configured for additive manufacturing of a three-dimensional component from powder, the method comprising:
    arranging a building platform on the substrate;
    capturing a plurality of images of the working surface in a region of the substrate;
    adjusting an image-specific height of the substrate before capturing one of the plurality of images;
    applying or removing a powder layer depending on the change of direction in the height of the substrate;
    determining a powder boundary line between a powder-free region and a powder-covered region of the building platform for at least two of the plurality of images that have been captured for differently adjusted image-specific heights of the substrate; and
    producing the control signal for positioning the substrate based on the at least two powder boundary lines.

2. The method of claim 1, wherein the powder boundary line is determined for one image of the plurality of images by image processing of the image, and the powder boundary line is assigned a transition zone caused by a building platform geometry.

3. The method of claim 1, further comprising determining the powder boundary line by one or both of comparing the images amongst one another and comparing a difference image generation of at least one of the images with a reference image of a completely closed powder layer.

4. The method of claim 3, wherein the reference image is a completely closed powder layer.

5. The method of claim 1, wherein the powder boundary line moves after layer application or layer removing with a coater with differently adjusted heights of the substrate according to a tilting of the upper side of the building platform in relation to the working surface, and the method further comprises determining a tilt angle from the relative positions of at least two powder boundary lines.

6. The method of claim 5, further comprising:
    determining a distance between two powder boundary lines in the plane of the working surface; and
    calculating a tilt angle from the determined distance and the respective change in height.

7. The method of claim 1, further comprising determining a tilt axis direction in the working surface from at least one of the at least two determined powder boundary lines.

8. The method of claim 1, further comprising
    determining a distance between two powder boundary lines in the plane of the working surface;
    calculating a tilt angle from the determined distance and the respective change in height;
    determining a tilt axis direction in the working surface from at least one of the at least two determined powder boundary lines; and
    outputting a tilt angle control signal as the control signal to an alignment unit of the substrate to cause tilting of the substrate around the determined tilt axis direction that is opposite to the calculated tilt angle.

9. The method of claim 1, further comprising determining a zero position from at least one of the at least two determined powder boundary lines, wherein in the zero position the upper side of the building platform lies in the plane of the working surface.

10. The method of claim 9, wherein the zero position is determined from at least one image-specific height of the substrate in which the respective at least one powder boundary line runs close to the center over the building platform.

11. The method of claim 9, wherein the substrate is adjusted in its height relative to the working surface such that after a tilting according to a tilt angle control signal, the upper side of the building platform lies in the plane of the working surface.

12. The method of claim 9, further comprising outputting a zero position adjusting signal as the control signal to an alignment unit of the substrate, to cause a shift of the substrate into a height assigned to the zero position.

13. The method of claim 1, further comprising determining, after compensating for a tilt, the height associated with an image of a newly produced sequence of images in which the powder-free region extends over the entire building platform.

14. The method of claim 1, further comprising applying or removing a powder layer depending on whether a height difference to the working surface was increased or reduced.

15. The method of claim 1, wherein the plurality of images of the working surface is captured in an iterative detection process in which iteratively several layer-applying or layer-removing processes of the building platform are performed, and between individual layer applying or layer removing processes a height of the substrate is changed by pre-determined height variations, and the region of the adjusted heights is selected such that at least in some of the plurality of images the building platform can be identified at least partially in the powder layer.

16. A manufacturing device for the additive manufacturing of a three-dimensional component from powder, comprising:
a manufacturing chamber with a working surface which includes a platform region,
a building cylinder that includes a height-adjustable substrate on which the three-dimensional component is to be manufactured in layers on a surface of a building platform,
an alignment device for positioning the substrate relative to the working surface,
a sliding device for applying or removing a layer of powder in the platform region,
an image generating device for obtaining image data of the platform region, and
a control unit connected with the image generating device, the control unit configured to receive the image data, send a signal to the alignment device for adjusting the height and the alignment of the substrate, and evaluate the image data by implementing a method for generating a control signal for positioning the substrate of the additive manufacturing device that is height-adjustable in relation to the working surface and is configured for additive manufacturing of the three-dimensional component from powder, the method for generating a control signal comprising:
arranging the building platform on the substrate;
capturing a plurality of images of the working surface in a region of the substrate; adjusting an image-specific height of the substrate before capturing one of the plurality of images; applying or removing the layer of powder depending on the change of direction in the height of the substrate;
determining a powder boundary line between a powder-free region and a powder-covered region of the building platform for at least two of the plurality of images that have been captured for differently adjusted image-specific heights of the substrate; and
producing the control signal for positioning the substrate based on the at least two powder boundary lines.

17. The manufacturing device of claim 16, wherein the sliding device comprises a brush coater or a coater with a soft coater lip.

18. The manufacturing device of claim 16, further comprising one or more of:
a camera as the image generating device,
an illuminating device for illuminating the platform region, and
an irradiation system for generating a beam for irradiating powder in the platform region for a layer-wise production of the three-dimensional component.

19. A method for aligning a surface of a building platform on a movable substrate of a manufacturing device for additive manufacturing of a three-dimensional component from powder on the building platform, the method comprising:
receiving a control signal for positioning the substrate, the signal generated according to a method for generating a control signal for positioning the substrate of the additive manufacturing device that is height-adjustable in relation to a working surface and is configured for additive manufacturing of the three-dimensional component from powder, the method for generating a control signal comprising:
arranging the building platform on the substrate;
capturing a plurality of images of the working surface in a region of the substrate;
adjusting an image-specific height of the substrate before capturing one of the plurality of images;
applying or removing a powder layer depending on the change of direction in the height of the substrate;
determining a powder boundary line between a powder-free region and a powder-covered region of the building platform for at least two of the plurality of images that have been captured for differently adjusted image-specific heights of the substrate; and
producing the control signal for positioning the substrate based on the at least two powder boundary lines, and
aligning the substrate according to the control signal.

* * * * *